US006693918B1

United States Patent
Dallabetta et al.

(10) Patent No.: US 6,693,918 B1
(45) Date of Patent: Feb. 17, 2004

(54) ELASTIC BUFFERS FOR SERDES WORD ALIGNMENT AND RATE MATCHING BETWEEN TIME DOMAINS

(75) Inventors: Michael J Dallabetta, Loveland, CO (US); Herman Pang, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/561,078

(22) Filed: Apr. 28, 2000

(51) Int. Cl.⁷ .................................................. H04J 3/06
(52) U.S. Cl. ........................ 370/503; 370/366; 370/504; 375/372
(58) Field of Search ................................ 370/366, 378, 370/419, 463, 503, 504, 505, 514, 516, 517; 375/364, 365, 372

(56) References Cited

U.S. PATENT DOCUMENTS 6,594,329 B1 * 7/2003 Susnow ...................... 375/372

* cited by examiner

Primary Examiner—Dang Ton
Assistant Examiner—Robert W. Wilson
(74) Attorney, Agent, or Firm—Edward L. Miller

(57) ABSTRACT

A solution to the word alignment problem in a Serializer Deserializer (SERDES)/Media Access Controller environment is to have for each SERDES lane: a recovered clock, a Write Pointer counter and a FIFO. Misaligned words are simply stored in their FIFO's according to the respective recovered clocks and straightforward increments of the various Write Pointers WP_i. One of the lanes is selected as a reference, and the contents of the other FIFO's are inspected to determine the nature of their misalignment, if any. Then the values from the Read Pointer counters RP_i are individually offset by corresponding amounts to compensate for the misalignment, so that when data is read it is indeed aligned. These offsets by corresponding amounts are simply individual per lane adjustments to the various Read Pointers, and cooperate with the adjustments to those Read Pointer for rate matching.

2 Claims, 5 Drawing Sheets

ELASTIC BUFFERS FOR SERDES WORD ALIGNMENT AND RATE MATCHING BETWEEN TIME DOMAINS

BACKGROUND OF THE INVENTION

Consider a high speed stream of data from a source environment, say, a fiber optic link having a bit data rate of 12.5 GHz, where this data is to be delivered to a destination environment and then processed some way in real time at that rate. One way that is done is to apply the high speed data stream to a Serializer/Deserializer (SERDES) that separates the data into, say, four adjacent streams often bit parallel data at a word rate of 312.5 MHZ. At the time of their origination the four data streams (hereinafter referred to as lanes) are in synchronous alignment, having all been created in a single common environment according to a common clock signal. It is thus the lanes of parallel data that are sent from the source environment (the SERDES) to some destination environment (perhaps a Media Access Controller, or MAC). Variations in the effective length of a lane or of its propagation constant can cause words that were sent into their respective lanes at the same time to emerge therefrom at different times. This problem is called word alignment. Misaligned words must eventually be correctly realigned, or else the reconstructed data will be corrupt. Prior art techniques for performing word alignment have involved the use of high speed clocks and techniques for "stretching" and "compressing" the electrical waveforms for the words. That is truly an ugly business fraught with many difficulties, such as the phase locking of very high speed clocks, and a servo system having some rather complicated logic.

It would be desirable if there were a simple and reliable way to perform word alignment that did not involve the use of high speed clocks and the distorted reconstruction of an electrical waveform for a word of data.

Another problem that besets the SERDES/MAC environment described above is that of rate matching. To appreciate this problem, note that the words are stored in First In First Out register structures (FIFO's). In the prior art the words are aligned before being stored; where they are stored in a FIFO is determined by a Write Pointer (WP). Each of the four lanes of data (annotated individually with the suffixes "_0" through "_3") has its own FIFO, so the collection of FIFO's is FIFO_1 through FIFO_3 and their respective Word Pointers are WP_0 through WP_3. The individual WP_i are created from circular counters that are incremented by individual lane clocks that are recovered from self clocking data in the respective lanes. There is a collection of Read Pointers (RP_i) that correspond to the WP_i, and they originate from a circular counter driven by a clock in the destination environment. There is no mechanism provided to force the WP_i and RP_i to increment at exactly the same rate; they are allowed to be slightly different, owing to drift, tolerances, etc. This was a decision made at the system design level, and is enforced by various written standards from standard setting agencies. As a consequence, there needs to be a way to prevent data corruption when one of the Read or Write Pointers begins to overtake the other. The various standard protocols for such systems as we have been discussing (involving Ethernet, HARI, and FIBRE, etc.) provide a mechanism for rate matching, so that the source environment and destination environment clocks need not run at exactly the same rate. The principal element of these mechanisms is the existence of Inter-Packet Gaps (IPG's) that contain special idle characters ("K" and "R") that are guaranteed never to occur in the data proper. (This bit of magic does not impose on the data sent the limitation that it avoid certain bit patterns. It involves instead an expansion of the number of bits used to express the data, so that there are unused codes in the expanded version. K and R belong to these unused codes in the expanded coding. The legend "8B10B" is the designation of one such expansion scheme developed by IBM, where eight bit bytes are re-encoded as ten bit bytes.) Since K and R never appear in the actual data, their presence indicates the occurrence of an IPG, and thus allows the high speed detection in real time of an IPG. The various protocol standards do not specify any particular size for an IPG, except that it be at least of a certain minimal size. Furthermore, the size of an IPG may be adjusted during transmission. Thus, effective data rate matching is achieved by adding or deleting K and R characters to the IPG's for all lanes whenever the Read and Write Pointers for any one lane get too close together. Now, and this is a neat trick, the IPG's to be modified exist as sequences of idle characters in the FIFO's. The ususal way to do rate matching is periodically to simply bump a Read Pointer ahead to delete a character or to bump it back to insert a character by repeating it. The character streams transmitted by such reading of the content of the FIFO looks exactly like deleting or inserting characters, respectively, even though no characters in the FIFO's actually change. This adjusting (as needed) of the effective size of the IPG's allows the real data to be sent at (continually) slightly mismatched rates without corruption. This is an established mechanism, and it would be especially desirable if it could be left intact, or even better, if it could cooperate with an improved way of performing word alignment, so that one mechanism does double duty, as it were.

SUMMARY OF THE INVENTION

A solution to the word alignment problem described above is to have for each lane: a recovered clock, a Write Pointer counter and a FIFO. Misaligned words are simply stored in their FIFO's according to the respective recovered clocks and straightforward increments of the various Write Pointers WP_i. One of the lanes is selected as a reference, and the contents of the other FIFO's are inspected to determine the nature of their misalignment, if any. Then the values from the Read Pointer counters RP_i are individually offset by corresponding amounts to compensate for the misalignment, so that when data is read it is indeed aligned. These offsets by corresponding amounts are simply individual per lane adjustments to the various Read Pointers, and cooperate with the adjustments to those Read Pointer for rate matching.

DESCRIPTION OF A PREFERRED EMBODIMENT

Figure 1:
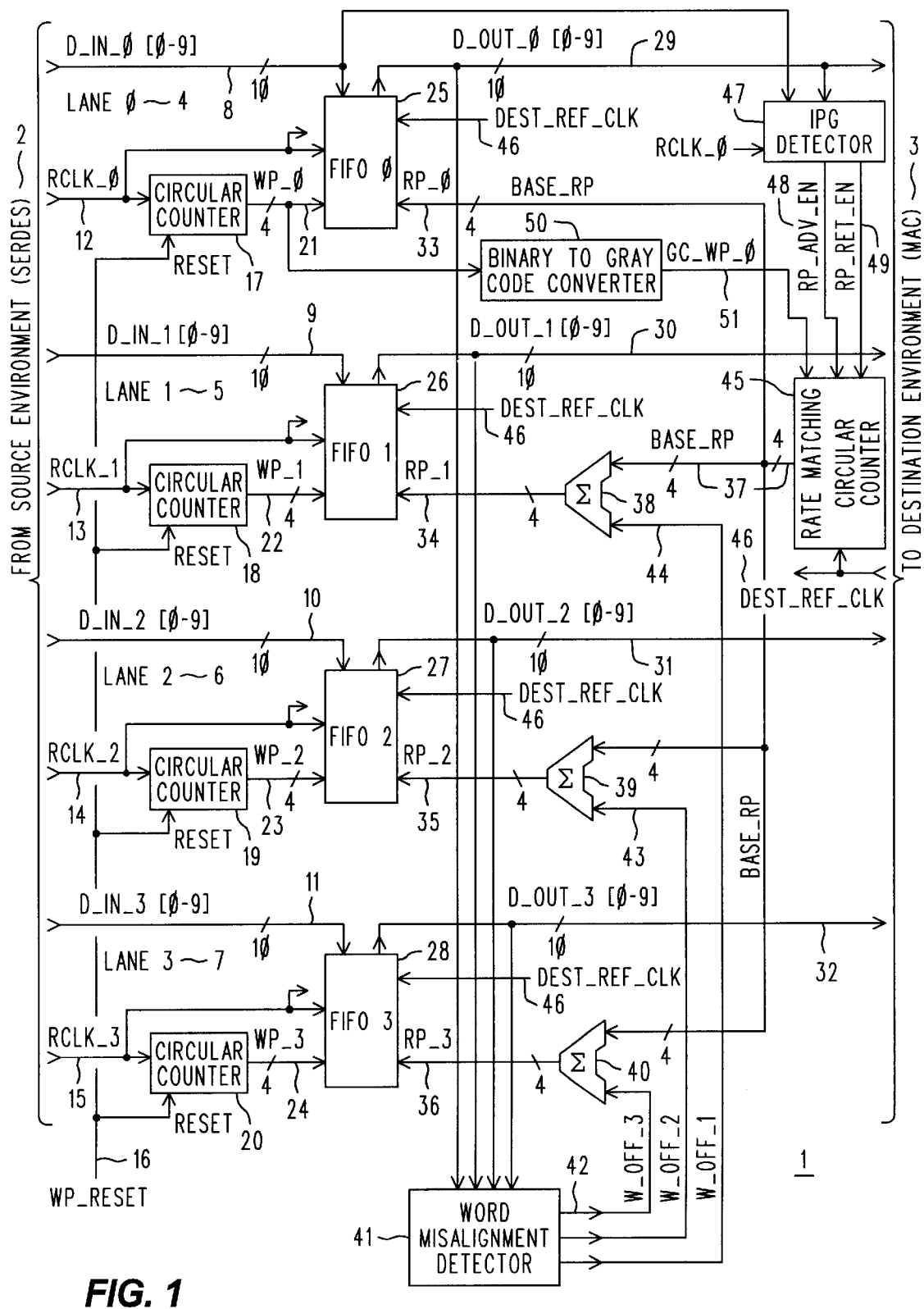
FIG. 1 is a simplified block diagram of an elastic buffer for a SERDES/MAC environment in which the invention may be practiced.

Refer now to FIG. 1, wherein is shown a simplified block diagram 1 of an elastic buffer that performs word alignment and rate matching in an example SERDES/MAC environment. The elastic buffer is implemented as an integrated circuit. The figure shows four lanes, labeled LANE 0 through LANE 3 and that arrive at the elastic buffer from some source environment 2 (not specifically shown), say, a SERDES, and that after word alignment and rate matching will be sent to a destination environment 3 (not specifically shown), which may be a MAC. Each lane includes a ten bit (parallel form) word of data (D_IN_0[0–9] through D_IN_3[0–9] (8–11)) and an associated recovered clock (RCLK_0 through RCLK_3 (12–15)). Each lane also has a FIFO (25–28) whose data input is coupled to the ten bit word of data (8–11) for that lane. The recovered clocks (12–15) are used to increment respectively associated Circular Counters (17–20) whose respective outputs (21–24) are used as the Write Pointers WP_0 through WP_3 (21–24) for the lane FIFO's 25–28. A lane's input data is stored in a location in its FIFO, as indicated by the value of that FIFO's Write Pointer. The leading edge of a recovered clock signal is used to increment the associated Circular Counter, while the trailing edge is used to clock the input data into the FIFO at the incremented address. In one embodiment the FIFO's have sixteen locations, and the Write Pointers are of four bits.

The Circular Counters (17–21) are initially reset in common at start-up by a signal WP_RESET 16. Thus, they start producing Write Pointers that initially have the same value, but owing to the lane phenomena that produce misalignment in the first place, their individual values eventually become somewhat arbitrary with respect to each other. On the other hand, it is not the case that word misalignment is like a steady state drift for long periods of time. Remember that the recovered clocks for the various lanes all originate with a common clock, so their average frequency is always the same over any significant length of time. The degree of word misalignment will either be static or vary slowly within some range of values. So, at this point it will be appreciated that the FIFO's are functioning as independent circular buffers having, in this example, sixteen locations each of ten-bit width.

Before proceeding, note that LANE 0 (4) is used as a reference lane. This means that misalignment of the other three lanes (5–7) will be construed with respect to LANE 0. In principle, any lane could be the reference lane, and a change in which lane is taken as the reference could be effected by interchanging which actual lane hardware is connected to the elastic buffer mechanism 1. Viewed in the light of such permanence, saying LANE 0 is the reference lane is essentially a labeling convention, although we shall see that LANE 0's hardware is different in some ways either to allow it to perform in a reference capacity or because some items are unneeded. To anticipate slightly what is ahead, a more general case will be outlined in connection with a later figure, where the selection of the reference channel is programmable without actually interchanging input and output connections. A comparison of the two figures will reveal that the block diagram 1 of FIG. 1 enjoys a slight additional simplification arising from hardwiring LANE 0 as the reference lane: one adder (ala 38–40) and one word offset signal (ala W_OFF_1 through W_OFF_3 (42–44)) are missing. To create the general case this stuff is put back in and several blocks in the diagram are connected via MUX's to multiple lanes. There is, however, nothing wrong with the block diagram 1 of FIG. 1, and it is an excellent place to appreciate the principles of the invention in a setting that is, shall we say, uncluttered by an extra layer of generality.

To continue, then, there must be a mechanism to read data from the FIFO's, and indeed there is. Each FIFO has a respective Read Pointer (RP_0 through RP_3 (33–36)) whose four-bit value initially originates with a Rate Matching Circular Counter 45. As we shall see, that counter 45 does more than just count: it needs to be able to advance or retard its count by preselected amounts whenever the need to do so arises. That said, it will be appreciated that as a counter its function for the Read Pointer is similar to that of the counters 17–20 for the Write Pointers: the various ten bit wide data outputs for the FIFO's (D_OUT_0[0–9] through D_OUT_3[0–9] (29–32)) are read from locations identified by the values of the various Read Pointers (33–36). In this capacity, the Rate Matching Circular Counter 46 is clocked (stepped) by the leading edge of a signal Destination Reference Clock (DEST_REF_CLK) 46. It originates in the Destination Environment 3, and regulates the rate at which the Destination Environment consumes or accepts data from the elastic buffer 1. The trailing edge of DEST_REF_CLK clocks the data for the incremented or otherwise changed count out of the FIFO's. It will be appreciated that the need for rate matching arises from the fact that DEST_REF_CLK 46 is not at exactly the same frequency as the various recovered clocks RCLK_0 through RCLK_3 (12–15). The four bit output of the counter 45 is called BASE RP (Base Read Pointer), and is applied directly to the LANE 0 FIFO 25 as its Read Pointer RP_0 (33). The FIFO's (26–28) for the other lanes have Read Pointers that produced by respective adders (38–40) that combine BASE_RP 37 with Word Offsets (42–44) respectively associated with each lane. These Word Offsets are the signals W_OFF_1 through W_OFF_3, and are produced by a Word Misalignment Detector 41 that is in turn connected to the data outputs (29–32) from the FIFO's. The signals W_OFF_1 through W_OFF_3 indicate the misalignment, relative to LANE 0, of their respective lanes 1–3 (5–7). Since it is the reference, LANE 0 (4) is never misaligned with itself. If there were a signal W_OFF_0 its value would always be zero in this block diagram. Thus, it and the associated adder (for FIFO_0 25) can be suppressed. (The signal W_OFF_0 and its associated adder reappear as necessary items if reference channel selection is programmable.)

There is one more block in the block diagram 1 of FIG. 1. That is the IPG Detector 47. It is coupled to both the data (8) being written into and that (29) being read from FIFO_0 (25) for LANE 0 (4). It is also coupled to the recovered clock of the reference lane of the Source Environment and to the clock DEST_REF_CLK of the Destination Environment. Essentially, its function is to detect the occurrence of the special IPG idle characters K and R. Such detection is the condition that enables the adjustment of the count in the Rate Matching Circular Counter 45. A simple IPG Detector might be coupled only to the reference lane output data 29 and produce a single signal Read Pointer Change Enable. That would work, but at the expense of imposing a hidden extra minimum length requirement on the IPG. This is discussed in more detail below, but in short, the arrangement shown here allows the generation of two Enable signals: Read Pointer Advance Enable (RP_ADV_EN) 48 and Read Pointer Retard Enable (RP_RET_EN) 49. With separate enable signals for advancing and retarding the counter 45 there is no associated increased minimum size requirement for an IPG (i.e., how many K's and R's it is to contain).

We turn now from a description of what is in the block diagram of the elastic buffer 1 to a discussion of how it works. We shall begin with its overall operation, followed by more detailed looks at the topics of word alignment, IPG detection and rate matching. Finally, we shall briefly examine some alternatives.

The four lanes of incoming data (8–11) are each stored in a respective FIFO (25–28). No attempt is made to detect or deal with data misalignment as it is stored. In a preferred embodiment it is convenient, although not in principle necessary, to rely upon lane misalignment relative to a reference lane never being greater than one word. If there were such large misalignment the data would be out of specifications for its associated standard. (It is also assumed that for each lane the SERDES has supplied ten bits of data that properly go together, and not, say, two bits of one word conjoined with eight bits of another.) A word can be a data character D (say, anything that was expressible originally in eight bits), or one of the special non data idle characters K and R. A packet is made of a large number of words, perhaps some power of 2, such as $2^{10}$, or even larger. Since the FIFO's each hold only sixteen characters, if there were a misalignment event that occurred in the middle of a large packet it would be undetectable merely by an examination of FIFO contents as they appeared at the time of the misalignment event. The data in the FIFO's is arbitrary, and there is no way to tell merely by looking at a "center slice" of a packet (as stored in the FIFO's) that it is not what it should be. Misalignment events are not generally abrupt, however. It is more the case that one becomes more pronounced gradually over time, and that if it can be recognized at IPG time and dealt with, then that is sufficient. That is, we are going to assume that we never need to deal with misalignment that comes and then goes away again while in the middle of a packet. Thus, we shall check for misalignment only during an IPG.

Now, it is easy to tell that an IPG is passing through the elastic buffer: it will exhibit the special characters K and R (that is why they are there) and no other part of a packet will contain either K or R. Furthermore, part of the way the SERDES works is that each lane starts out having a simultaneous and identical pattern of K's and R's during an IPG. Suppose, then, that a K or an R is read out of the FIFO 25 for the reference LANE_0 (4). If there has been no misalignment, then we can be assured that the corresponding read operation for the other FIFO's would produce the same symbol. Since we also know that misalignment is either static or proceeds very slowly, and that we are going to fix it before it gets to be more than one word, anyway, we can turn the argument around and say that if the symbols just read from the reference FIFO and another FIFO are both K or both R, then there is no misalignment between the reference lane and that other lane. So far, so good. But what of the cases where there is misalignment?

Suppose now that LANE_1 is arriving somewhat early compared to the reference (LANE_0). A moments reflection will satisfy the reader that, while it alters the time sequence in which things happen (an R for FIFO _1 is stored slightly sooner than the R for FIFO_0 is stored), it does not alter the relative locations of these two R's: each is the "next" location. Thus, when read with a common value for the Read Pointer (which is what we would do if we had no inclination to do otherwise), those two R's will each appear as the normal data for their respective FIFO's, as if there were no misalignment! That is, nothing additional needs to be done to fix the case where a lane is misaligned by up to one word early relative to the reference lane. The described clocking in and out of the FIFO's has already fixed it.

Now consider the other case, where LANE_1 is late with respect to LANE_0. In this case the Write Pointer WP_1 for LANE_1 will have been incremented before its incoming FIFO data (say, as before, R) is stored. So now when the Read Pointer RP_0 for FIFO_0 advances to a value that reads the corresponding R, reading FIFO_1 does not produce that R for RP_1 equal to RP_0. If the IPG data is constrained to avoid repeated characters (the HARI standard uses KRKR ... ), then we are guaranteed that the two special characters will be unequal, and can use that as an indication that LANE_1 is misaligned by one word late relative to LANE_0. In this case we would want to set W_OFF_1 to a one to introduce a one word offset in RP_1. That undoes the one word misalignment of LANE_1 relative to LANE_0, as far reading the data is concerned. And that is all the Destination Environment cares about, anyway.

However, if we were to directly control W_OFF_1 by steady state equality or inequality between idle characters we would have trouble. Its an oscillator. If setting W_OFF_1 true cleared the misalignment the difference would go away, which would take W_OFF_1 away and restore the misalignment, bringing W_OFF_1 back TRUE, etc. Instead, we are going to toggle W_OFF_1 each time there is a difference between LANE 1 and the reference lane. Then, if we get W_OFF_1 to a value that cures the misalignment there are no unequal idle characters and W_OFF_1 simply stays at that curative value and the lane remains aligned. If it should drift (back the other way!) to being misaligned then W_OFF_1 will again toggle and that ought to fix it.

There are some housekeeping concerns relating to how the Word Misalignment Detector 41 ought to work. The technique described will work provided that either a K or an R special character is the latest character that has just been read out for each lane. That is, ordinary data characters that might appear in a lane at the boundary of an IPG are to be excluded from influencing the result. Also, the setting of the W_OFF_i and the response to their changes in value needs to all fall within one cycle. Provided these conditions are met (all idle characters and no latency), then each non reference lane's current character is compared to the reference lane's current character to determine if they the same or different. Sameness for a lane indicates alignment during read. Difference for a lane indicates that the lane is late, and that the Read Pointer for lane's FIFO needs to have a toggled offset of one. Since the matching K or R was stored late, it will be in the next FIFO entry, and if that entry is accessed instead, that character will correctly match up. So the offset needs to increment the Read Pointer for that lane's FIFO. A toggled offset of one can do that. Once that is done the misalignment for that lane will appear to have vanished until there is further change in the behavior of the lane.

We turn now to the issue of rate matching. Once again, we need to restrict the actions taken to effect rate matching to the interior of an IPG. So we need IPG detection. However, the lanes will be aligned, so it is sufficient to examine the current characters for the FIFO of the reference lane to see if they are K or R. We could use just the character currently being input or just the one most recently read out. We will find it convenient, however, to be aware of them both, as this will allow shorter IPG's.

The reader will recall that rate matching is accomplished by altering the length of the IPG. Suppose the DEST_REF_CLK for the Destination Environment is running fast. Since we are not allowed to slow it down we need to give it more (harmless) characters to read. The technique is to make it read some of the same IPG characters over again by introducing a permanent retardation into the value of the Read Pointer (BASE_RP), which is a common value used by each of the FIFO's. (Each individual FIFO's actual Word Pointer value is BASE_RP as adjusted by any steady state increment needed to produce alignment, but that fact does not interfere with the logic of the preceding sentence.) And in the case where DEST_REF_CLK runs slow, we then need to allow it to skip the reading of some IPG characters by advancing the value of DEST_REF_CLK.

These advancings and retardations need to occur as needed on an ongoing basis, and over a long period of time can amount to a tremendous number of counts. Hence, rather than offset the value of the Rate Matching Circular Counter with an external adder, we need to simply get in there and mess with the counter's value on an as needed basis. So, the questions are: When do we do it; By how much; and, Which way?

We want to do it whenever the elastic buffer is transmitting an IPG and it appears that the Read and Write Pointers are getting too close for comfort. We'd prefer that they stay about a half count cycle (eight counts) apart in value. Clearly then, we need to take the difference between WP_0 and RP_0. There is nothing terribly special about the arithmetic needed, but there is a complication that must be addressed. The difficulty falls in the category called time domain crossings, and involves the ugly prospect of metastability. The situation is this. WP_0 is clocked by the Source Environment 2, while RP_0 is clocked by the Destination Environment 3. The difference is going to get used by a process clocked by the Destination Environment, so we choose to bring the value of WP_0 into the Destination Environment and do all further operations there. (The bringing over is the actual time domain crossing part.)

WP_0 is a four-bit count. To bring WP_0 over we apply it to two cascaded four-bit latches that are clocked by DEST_REF_CLK. These latches are not visible to us yet; they are located in the Rate Matching Circular Counter 45. The use of such latches in time domain crossing is well understood. However, this is not everything that needs to be done. The metastability problem attaches to any bit that might change from one count to the next as the count passes from one time domain to another. Another way to describe this is to say that any bit that might change from one count to the next is subject to uncertainty. Now, regular binary often has many bits that transition from one count to the next. The result is that, even with the cascaded latches, there is multi-bit uncertainty. That will never do. The solution is also familiar to those skilled in this sort of thing. The value being sent across the time domain boundary is converted to a Gray Code before it is sent. A Gray Code only ever has but one bit that changes from one count to the next. This limits the damage to a simple one count uncertainty, which we are forced to live with. Accordingly, WP_0 21 is applied to a Binary To Gray Code Converter 50 whose output GC_WP_0 (Gray Coded Write Pointer Zero) 51 is then applied to the Rate Matching Circular Counter 45. It is in there that the time domain crossing's cascaded four-bit latches are located and the needed subtraction is subsequently performed. A last bit of detail is needed to get this scheme to work. The Gray Coded value GC_WP_0 (the minuend in the subtraction) is delayed by two clock times before it is available for subtraction (a result of the metastability fix). So, we are obliged to delay the subtrahend (RP_0) by a similar two clock cycles, lest the subtraction not give us the truth. Next, we are about to subtract a standard binary value from a Gray Coded value. The choices are to either convert it back (possible delay, extra silicon, and is perhaps redundant) or to go ahead and do the usual two's complement and addition, but alter the truth table of the adder to accommodate (undo) the Gray Code internally and produce the right answer anyway. We prefer to do the latter.

So, with the above considerations in mind, we proceed to take the difference between WP_0 and RP_0, and if it is about eight, then nothing further needs to be done at this time. Now, WP_0 and RP_0 are unsigned integer values in the range of zero to fifteen. We want WP_0 to stay ahead of RP_0 by about eight. So we form WP_0 minus RP_0 and compare the difference to a range, say, six to ten. If it is that range, then we shall deem that it is close enough to eight and do nothing. Those familiar with modulo two's complement arithmetic will appreciate that this result obtains despite wrap-around in the values as they increment over time, say as WP_0 goes from fifteen to zero and then one, while RP_0 goes from say, seven to eight to nine. (One minus nine $mod_{16}$ equals eight.)

Now suppose that RP_0 is incrementing faster than WP_0. As they begin to approach each other, regardless of where they are in the count cycle, their difference will become smaller. When it gets into the range of one through five we feel a definite urge to decrement the value of the Read Pointer by four to insert four extra IPG characters. We can do this safely (i.e., without fear of disturbing adjacent non IPG data) if the four characters most recently read from the reference FIFO were four consecutive special characters. This is the meaning of the signal Read Pointer Retard Enable (RP_RET_EN) 49 that is generated by the IPG Detector 47. The choice of four most recently read special characters arises from this. When we retard the value of the count for RP_0, we want to be sure that it ends up pointing to a another special character. It will point to whatever we just read four clocks ago (i.e., the start of the insisted upon four special characters just read), and neither it nor the three following it will have been overwritten by the input side, since the Write Pointer is not overtaking the Read Pointer.

Now consider the case when RP_0 is incrementing slower than WP_0. Eventually the difference will become a large number, in the range of eleven to fifteen. In this case we want to advance the value of the Read Pointer by four (so that the pointer values will become properly spaced apart again). Doing this means not having to read so many characters, which is how the catching up is performed. This case is more complicated, and the rule is this: If six consecutive special IPG idle characters have most recently been observed being written to the FIFO for the reference lane and the output of the reference FIFO is also a special IPG idle character, then the signal Read Pointer Advance Enable (RP_ADV_EN) 48 is generated. That, in conjunction with a difference in the range of eleven to fifteen will safely advance the value of the Rate Matching Counter 45 by four counts. The six consecutive special characters can be accounted for in this way. Four of them are needed to represent the locations that are to be skipped over by advancing the Read Pointer. This is to keep data from getting clobbered. The remaining two are needed for safety, to allow for a two character uncertainty produced by the two cycle delay of the cascaded latches used by the time domain crossing.

The difference WP_0 minus RP_0 is always formed within the counter 45, which gets WP_0 from across a time domain boundary, as explained above, for the purpose of making the difference (it already has RP_0, since it is the source for that count). The difference is compared against the three-range partition of one to five, six to ten and eleven to fifteen. The result of that comparison is gated with the Read Pointer Advance and Retard Enable signals (48, 49) to decide when to provoke the counter 45 to advance or retard itself.

Figure 2:
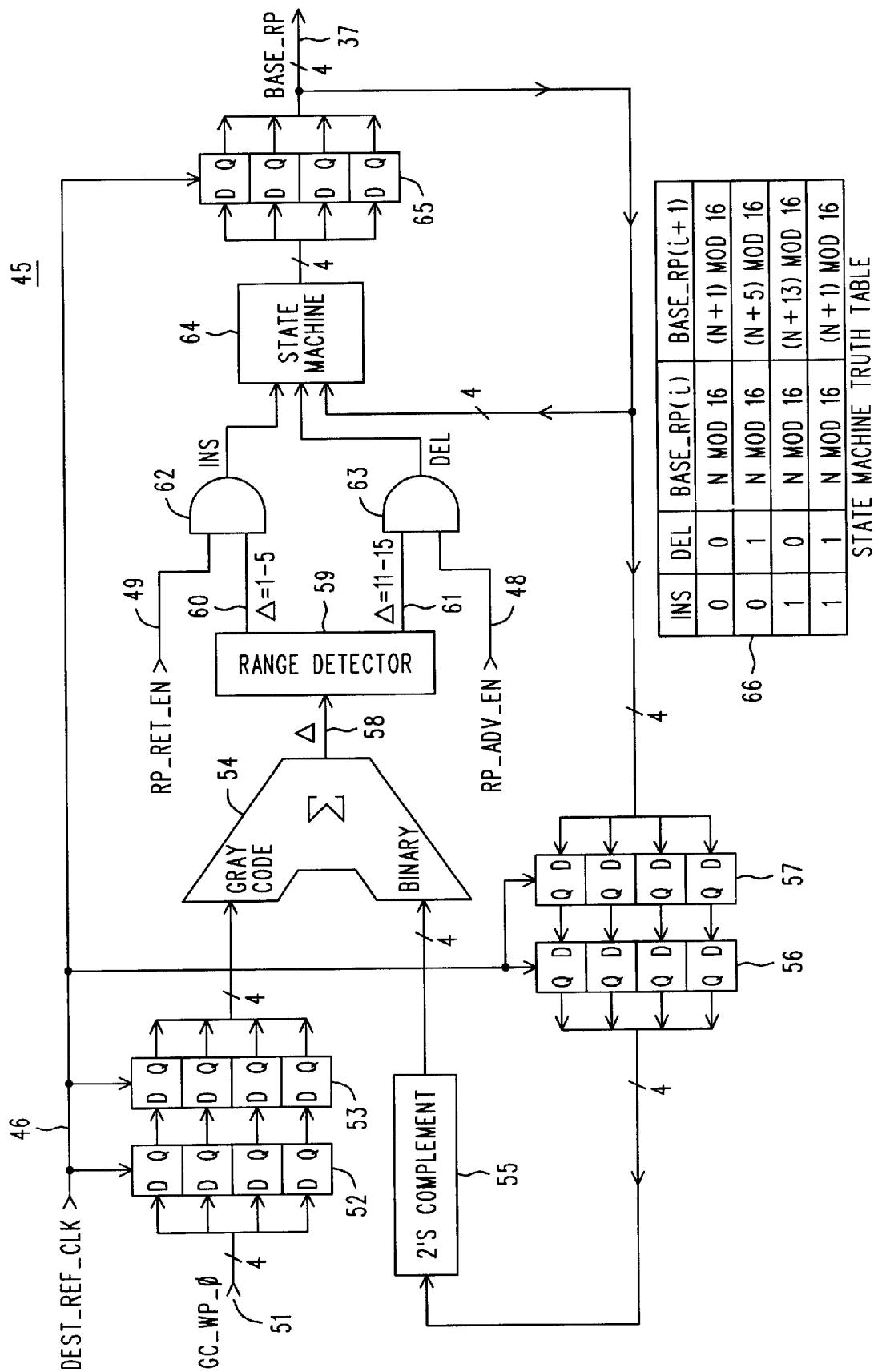
FIG. 2 is a simplified block diagram of a Rate Matching Circular Counter used in the block diagram of FIG. 1.

Refer now to FIG. 2, which is a simplified block diagram of the Rate Matching Circular Counter 45. We have already described the functional attributes of the Rate Matching Circular Counter 45, so it is believed that the block diagram of FIG. 2 will be appreciated without an extensive discussion. Briefly then, its principal inputs are GC_WP_0 (the Gray Coded version of WP_0) 51 and the rate matching enable signals RP_ADV_EN 48 and RP_RET_EN 49. It also receives the clock signal DEST_REF_CLK 46 that is the destination side of the time domain crossing. The Gray Coded version of WP_0 51 is applied to two four-bit cascaded latches 52 and 53 that are each clocked by DEST_REF_CLK 46. The output of latch 53 is delayed by two clock cycles, is a value that has crossed into the destination time domain, and is then applied, still in Gray Code (although it could be converted back to binary here if desired), to an input of an adder 54. The other input of the adder 54 is the two's complement of the value that is to be subtracted from WP_0, namely BASE_RP 37 (which is used as RP_0) after having been also delayed by two clock cycles in latches 56 and 57. The truth table (not shown) of the adder 54 has been adjusted to undo the effects of the Gray Code for the WP_0 input. The output of the adder 54 is a difference signal Δ 58, which is in turn applied to a Range Detector 59. It determines if Δ is in the range of one to five (signal 60) or in the range of eleven to fifteen (signal 61). The six to ten range is of interest in principle, but since it does not cause a specific action it can be eliminated through minimization.

The signal 60 for Δ equal one to five is AND'ed by AND gate 62 with the signal RP_RET_EN 49 originating with the IPG Detector 47. If they are both TRUE then the signal INS (Insert special characters) is also true. It is applied as an input to a State Machine 64. In like fashion the signal 61 for Δ equal eleven to fifteen is AND'ed by AND gate 63 with RP_ADV_EN, also originating with the IPG Detector 47. The output of AND gate 63 is a signal DEL (Delete special characters) that is also an input to the State Machine 64. The final input to the State Machine 64 is the current value of BASE_RP 37. The State Machine 64 has the properties of a circular four-bit counter, augmented by the ability to increment or decrement its value by four upon assertion of DEL or of INS, respectively. See the Truth Table 66. Four-bit latch 65 captures the next value of BASE_RP 37, from whence it is sent to the various locations where it is used.

Figure 3:
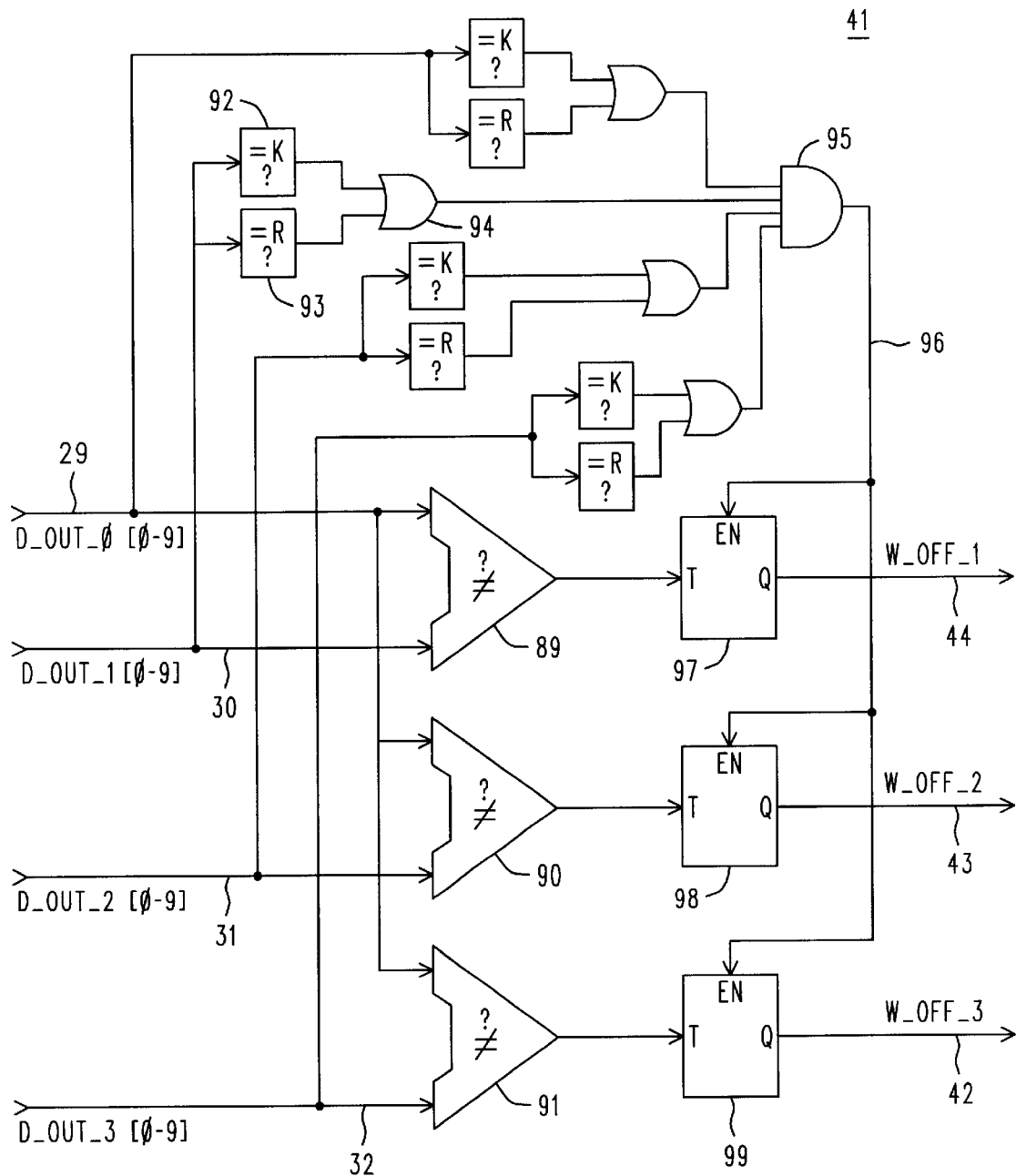
FIG. 3 is a block diagram of a Word Misalignment Detector circuit used in the block diagram of FIG. 1.

Refer now to FIG. 3, which is a block diagram of the Word Misalignment Detector 41. As can be readily seen, it includes three comparators 89–91 that produce ones as outputs whenever their inputs are not equal. Each comparator compares the data word just read from the reference lane (LANE 0) to the data word just read from each other lane, and their respective outputs are latched into a collection of Toggle flip flops 97–99. The toggle flip flops are enabled by a signal 96 which is easily seen as representing that each lane exhibits an idle character K or R. For example, each lane feeds to comparators (e.g., 92 and 93) that respectively detect K and R. The detections are OR'ed together (94) so that either idle character is accepted, and then the outputs of all the OR gate are AND'ed with AND gate 95. When output signal 96 form AND gate 95 is TRUE it means that every lane exhibits an idle character. It is then that the toggle flip flops are enabled. Now, each time during an IPG that a lane changes from aligned to misaligned its associated toggle flip flop will change state. Recall that when a lane is early with respect to the reference lane there is no misalignment, misalignment only occurs when a lane is late. Each time a lane is late its associated comparator 89–91 will produce an output. Assuming that we are in an IPG that will toggle the associated toggle flip flop. A first toggle may fail to correct misalignment during start-up, but then next toggle will correct it, so the system sync's up within a cycle or two of such toggling. Once a lane is sync'd up its toggle flip flop changes only to track new misalignment events.

Figure 4:
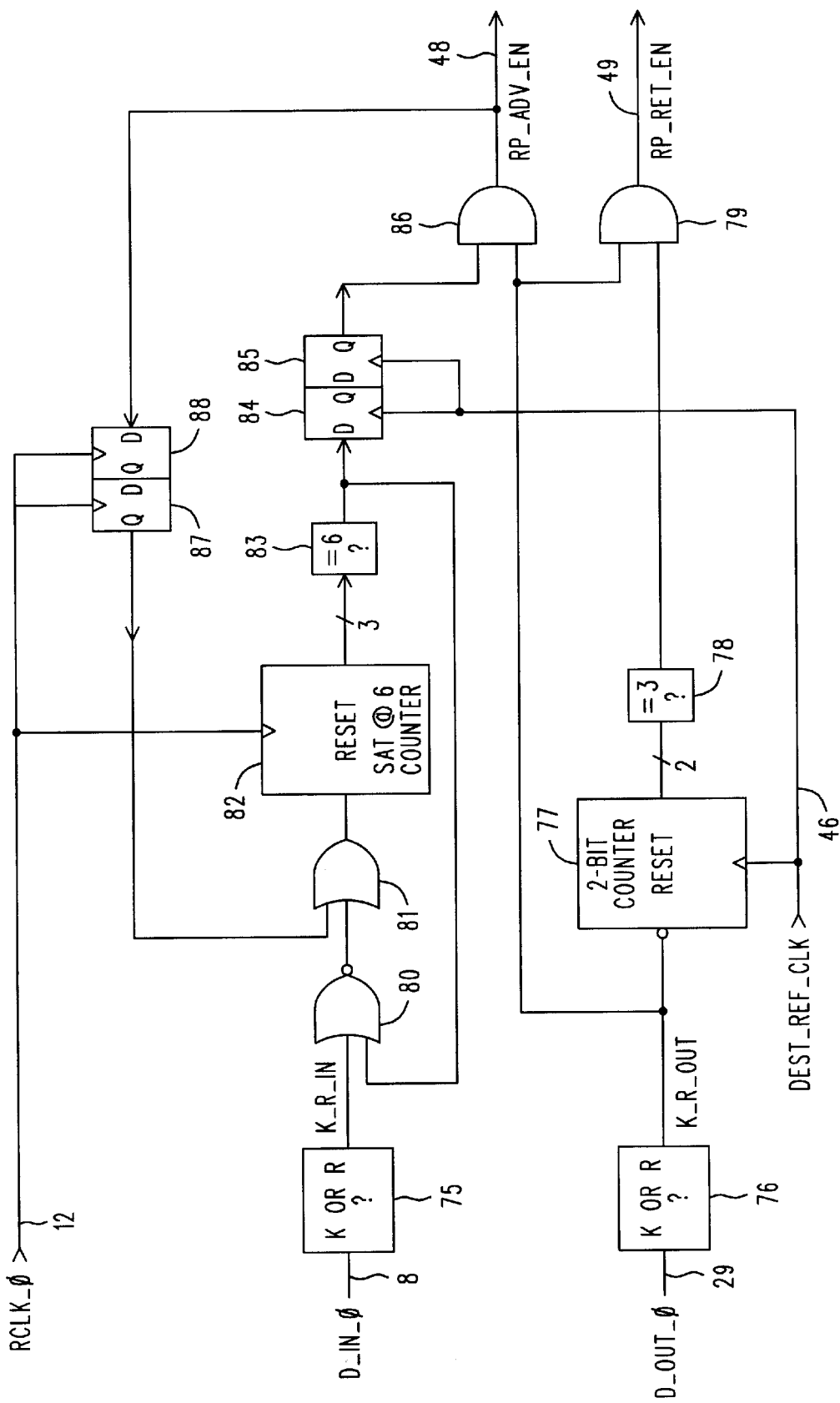
FIG. 4 is a block diagram of an Inter-Packet Gap (IPG) Detector circuit used in block diagram of FIG. 1.

Refer now to FIG. 4, which is a block diagram of the IPG Detector 47. Consider how it generates RP_RET_EN 49 by detecting four consecutive idle characters on D_OUT_0 29. A comparator 76 identifies K or R and produces K_R_OUT. If that happens it removes the reset from a two-bit counter 77 that is clocked by DEST_REF_CLK 46. When that counter gets to a count of three and output is produced from comparator 78. That means that there have been three idle characters, but after a delay of getting through the counter. If K_R_OUT is also true at this same time then that is the fourth instance of an idle character, recognized before the delay of getting the count up. Anyway, AND gate 79 recognizes this condition (four idles) and produces RP_RET_EN 49. That output will go back false in another count of the counter 77, but it will have been TRUE long enough to be effective.

The operation of the rest of the IPG detector is slightly more complicated. The idea is to recognize six consecutive idles on the write side of the reference FIFO and then produce RP_ADV_EN. In this case there are two time domain crossings. One occurs since the needed signal is on the read side, and explains why cascaded latches 84 and 85 are present in the path to the AND gate 86 that produces RP_ADV_EN. The other crossing is going back the other way (latches 87 and 88), as the state of RP_ADV_EN is used in the reset rule for a saturating counter used in the counting up to six. The counter 82 only counts while K_R_IN is TRUE, and is reset two cycles after RP_ADV_EN is asserted.

Figure 5:
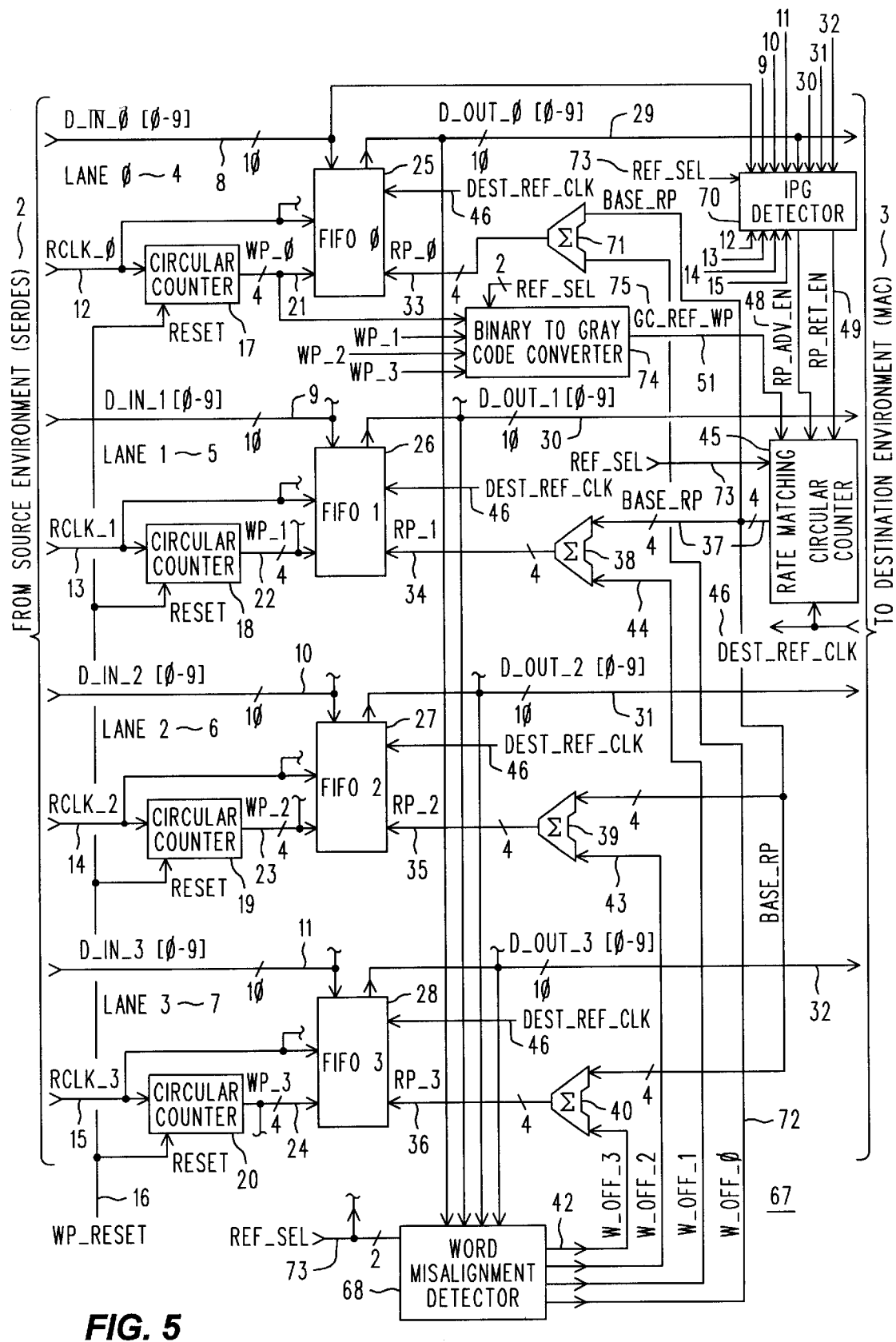
FIG. 5 is a simplified block diagram similar to that of FIG. 1, but modified to allow programmable selection of the reference lane.

Finally, consider the block diagram 67 of FIG. 5. It shows in a general way what changes are needed to make the elastic buffer mechanism described above have a programmable reference lane. In this figure elements that are unchanged, or are generally very similar, have the same reference characters assigned as in FIG. 1. Briefly then, we assume that a two bit code REF_SEL 73 has been produced somewhere (not shown) and that it indicates by its binary value which of LANE 0 through LANE 3 is to function as the reference lane. REF_SEL 73 goes to several places. These are to a slightly modified Word Misalignment Detector 68, a slightly modified IPG Detector 70, and a slightly modified Binary To Gray Code Converter 74. Generally speaking, these circuits are modified in a similar way in that MUX'es (not shown) are added to allow an input or output word associated with the lane identified by REF_SEL to be used in place of one that was permanently associated with LANE 0. These MUX'es may be fabricated from tri-state drivers to promote simplicity and low power consumption.

There are a few other changes of note that we shall mention. In no particular order, then, note that the Word Misalignment Detector is also extended to produce the signal 72 W_OFF_0, which is unneeded in FIG. 1. Similarly, there is now an adder 71 that combines W_OFF_0 with BASE_RP to produce RP_0, just as is done for the other lanes. The IPG detector 70 now gets all of the data input words 8–11 and data output words 29–32 for each of the FIFO's, as well as all of the recovered clocks 12–15. This business with the clocks is so that it continues to produce signals 48 and 49 that have a time domain crossing delay matching that for the Rate Matching Circular Counter, regardless of which lane is the reference lane.

In the arrangement shown in the figure, the Rate Matching Circular Counter 45 escapes modification because we modify the Binary To Gray Code Converter, instead. It now gets all of the Write Pointers, and uses REF_SEL to MUX in the correct one to convert. Then the name of the output is changes to GC_REF_WP 75, and we send it to the Rate Matching Circular Counter 45 in place of what used to be WP_0. Counter 45 never knows the difference. Even the two-state delay associated with the time domain crossing adjusts automatically, since the only actual clock used to accomplish it is DEST_REF_CLK. The recovered clock for the reference lane appears only indirectly, as timing of the edges for the reference lane's Write Pointer count (GC_REF_WP) that is sent to the Rate Matching Circular Counter.

There is one other detail worth mentioning. Regardless of whether the embodiment is that of FIG. 1 or of FIG. 5, the initial release of RESET signal 16 should be synchronized with a benign edge of whichever of the recovered clock signals 12–15 is associated with the reference lane. This is done for the benefit of the Word Misalignment Detector 41/68.

We claim:

1. A method of aligning data in lanes transmitting packets of successive data characters separated by inter-packet gaps of pluralities of distinct first and second idle characters, the method comprising the steps of:

selecting a lane as a reference lane;

storing the characters of each lane in consecutive locations of respective FIFO's according to transitions in respective clock signals recovered from each lane;

simultaneously reading with respective lane read pointers based on a common read pointer a next character from each FIFO;

detecting, for each lane, if each simultaneously read next character is an idle character;

determining relative to the reference lane for each non reference lane if the associated simultaneously read characters are different characters;

for each lane that the detecting and determining steps are both in the affirmative, toggling respective latches associated with each lane; and incrementing the associated lane read pointers by amounts in counts that are above the value of the common read pointer, the amounts in counts corresponding to the states of the respective toggled latches.

2. A method as in claim 1 wherein rate adjustment between storing the characters and simultaneously reading the next characters is accomplished by an advancement and retardation during an inter-packet gap an incrementing sequence for the common read pointer.

* * * * *